(12) United States Patent
Breedvelt-Schouten et al.

(10) Patent No.: US 7,712,032 B2
(45) Date of Patent: May 4, 2010

(54) RANGE CONDITION MANAGING SYSTEM AND USER INTERFACE THEREOF

(75) Inventors: Ilse Breedvelt-Schouten, Manotick (CA); Lise Whitewolf, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 11/195,270

(22) Filed: Aug. 2, 2005

(65) Prior Publication Data
US 2006/0294142 A1 Dec. 28, 2006

(51) Int. Cl.
*G06F 3/00* (2006.01)
*G06F 3/048* (2006.01)

(52) U.S. Cl. .................................. 715/744; 715/764

(58) Field of Classification Search .................. 715/744, 715/764
See application file for complete search history.

(56) References Cited

U.S. PATENT DOCUMENTS

| | | | | |
|---|---|---|---|---|
| 5,581,677 | A * | 12/1996 | Myers et al. | 345/440 |
| 5,784,067 | A * | 7/1998 | Ryll et al. | 345/440 |
| 5,850,221 | A * | 12/1998 | Macrae et al. | 715/853 |
| 6,108,640 | A * | 8/2000 | Slotznick | 705/26 |
| 6,240,425 | B1 * | 5/2001 | Naughton | 707/104.1 |
| 6,307,572 | B1 * | 10/2001 | DeMarcken et al. | 715/763 |
| 6,320,585 | B1 * | 11/2001 | Engel et al. | 345/440 |
| 6,322,502 | B1 * | 11/2001 | Schoenberg et al. | 600/300 |
| 6,426,745 | B1 * | 7/2002 | Isaacs et al. | 345/419 |
| 6,647,370 | B1 * | 11/2003 | Fu et al. | 705/8 |
| 7,003,720 | B1 * | 2/2006 | Davidson et al. | 715/236 |
| 7,016,866 | B1 * | 3/2006 | Chin et al. | 705/26 |
| 7,113,919 | B1 * | 9/2006 | Norris et al. | 705/26 |
| 7,237,205 | B2 * | 6/2007 | Sarel | 715/786 |
| 7,305,491 | B2 * | 12/2007 | Miller et al. | 709/248 |
| 7,346,520 | B2 * | 3/2008 | Etzioni et al. | 705/1 |
| 7,418,409 | B1 * | 8/2008 | Goel | 705/26 |
| 2003/0069773 | A1 * | 4/2003 | Hladik et al. | 705/7 |
| 2004/0008219 | A1 * | 1/2004 | Sarel | 345/700 |

OTHER PUBLICATIONS

Bryce, Bryce 5.0 User Guide for Macintosh and Window, MetaCreations Corporation, 1999, p. 1-403.*

Cognos Incorporated, "Cognos Query Studio User Guide—Topics about Custom Groups", Cognos ReportNet version 1.1MR1, May 27, 2004, 15 pages.

Cognos Incorporated, Custom Exception Highlighting "Cognos Enterprise BI Series, Cognos Powerplay", 2004, 12 pages.

Cognos Incorporated, Color Palettes—User Guide Cognos Enterprise BI Series, Cognos Visualizer Edition Client, 2004, 6 pages.

(Continued)

*Primary Examiner*—William L Bashore
*Assistant Examiner*—David Phantana-angkool
(74) *Attorney, Agent, or Firm*—Patterson & Sheridan, LLP

(57) ABSTRACT

A range manager system has a range definition controller, a range label handler, and a range definition indicator controller. The range definition controller controls setting of one or more boundary values defining one or more ranges. The range label handler handles labels of the ranges. The range definition indicator controller controls presentation of a range definition indicator representing definition of the ranges. The range definition indicator controller presents the ranges in vertical arrangement so as to provide an intuitive representation of the definition of the ranges.

21 Claims, 8 Drawing Sheets

OTHER PUBLICATIONS

Cognos Incorporated, Color Palettes—Tutorial "Cognos Enterprise BI Series, Cognos Visualizer", 2004, 4 pages.

Cognos Incorporated, "Cognos Enterprise BI Series, Cognos Visualizer", 2004, pp. 1-152.

Cognos Incorporated, "Visualizer Client", Visualizer (Viz) implementation of a range, 2004, pp. 1-4.

* cited by examiner

RANGE CONDITION MANAGING SYSTEM AND USER INTERFACE THEREOF

FIELD OF INVENTION

The present invention relates to a range manager system and a user interface thereof.

BACKGROUND OF THE INVENTION

In the Business Intelligence domain, reports are created in order to discover relationships between dimensions. One of the report creation needs is to easily identify ranges of values and assign a certain presentation characteristic to it. For example, users may want to see all Sales values above $200.000 highlighted in green to easily identify the products that sold the best.

In many definitions of ranges, it is easy for business users to make the mistake of overlapping ranges. For example, a business user may erroneously create a rule of "Sales>100,000 and SALES<120,000". In these cases, a business intelligence system needs to solve any overlapping ranges by either asking the user to create correct rules, or to apply rules automatically which may result in a confusing solution for the user.

Also, when the user wants to create multiple ranges, the user needs to include the ranges in the right "order" by moving them Up or Down in a list of ranges.

In order to assist users to define ranges, some existing business intelligence tools use "from-to" text boxes such that the user can insert values. These text boxes however do not provide to the user any clear indication as to what the values exactly mean, i.e., it is not clear if a value is included in the range or excluded.

Some existing business intelligence tools use operators, e.g., like >, <, and >=. This approach leaves the business users to understand the exact definition of the operators and to prevent overlaps.

Some existing business intelligence tools use horizontal lines that allow users to insert a value in the "right" spot along the lines. This approach causes problems with screen real estate when users want to use multiple ranges. Also, it is still unclear of the exact definition of the ranges at the borders.

It is therefore desirable to provide a mechanism that allows users to define correct ranges easily without getting problems of overlapping of ranges.

SUMMARY OF THE INVENTION

It is an object of the invention to provide an improved range manager system that attends to one or more problems discussed above.

The invention uses a range definition indicator that presents ranges in vertical arrangement, and presents border values in relation with border indications to visually indicate the definition of the ranges. The invention provides the ability to change a range value and have the value move to the correct location within the set of ranges.

In accordance with an aspect of the present invention, there is provided a range manager system comprising a range definition controller, a range label handler, and a range definition indicator controller. The range definition controller is provided for controlling the setting of one or more boundary values defining one or more ranges. The range label handler is provided for handling labels of the ranges. The range definition indicator controller is provided for controlling presentation of a range definition indicator representing the definition of the ranges. The range definition indicator controller presents the ranges in vertical arrangement so as to provide an intuitive representation of the definition of the ranges.

In accordance with another aspect of the invention, there is provided a range defining user interface comprising a range definition indicator controller. The range definition indicator controller is provided for presenting to a user a range definition indicator. The range definition indicator comprises one or more boundary value boxes, one or more ranges, and one or more range boundary indicators. The boundary value boxes are provided for presenting boundary values. The boundary value boxes are arranged vertically in order of the boundary values. The ranges are defined by the boundary values. The ranges being arranged vertically. The range boundary indicators are provided for indicating boundaries of the ranges based on the boundary values. A relative location of a boundary value box and its associated range boundary indicator visually represents to which range a boundary value shown in the boundary value box belongs.

In accordance with another aspect of the invention, there is provided a computer readable-medium storing computer readable code for use in the execution in a computer to manage range definitions. The computer readable code comprises code for controlling the setting of one or more boundary values defining one or more ranges, code for handling labels of the ranges, and code for controlling presentation of a range definition indicator representing the definition of the ranges. The range definition indicator controller presents the ranges in vertical arrangement so as to provide an intuitive representation of the definition of the ranges.

In accordance with another aspect of the invention, there is provided a computer readable medium storing computer readable code for use in the execution in a computer to present a range definition indicator. The range definition indicator comprises one or more boundary value boxes, one or more ranges, and one or more range boundary indicators. The boundary value boxes are provided for presenting boundary values. The boundary value boxes are arranged vertically in order of the boundary values. The ranges are defined by the boundary values. The ranges are arranged vertically. The range boundary indicators are provided for indicating boundaries of the ranges based on the boundary values. A relative location of a boundary value box and its associated range boundary indicator visually represents to which range a boundary value shown in the boundary value box belongs.

In accordance with another aspect of the invention, there is provided a propagated signal carrier containing computer executable instructions and/or statements that can be read and executed by a computer, the computer executable instructions being used to present a range definition indicator. The range definition indicator comprises one or more boundary value boxes, one or more ranges, and one or more range boundary indicators. The boundary value boxes are provided for presenting boundary values. The boundary value boxes are arranged vertically in order of the boundary values. The ranges are defined by the boundary values. The ranges are arranged vertically. The range boundary indicators are provided for indicating boundaries of the ranges based on the boundary values. A relative location of a boundary value box and its associated range boundary indicator visually represents to which range a boundary value shown in the boundary value box belongs.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
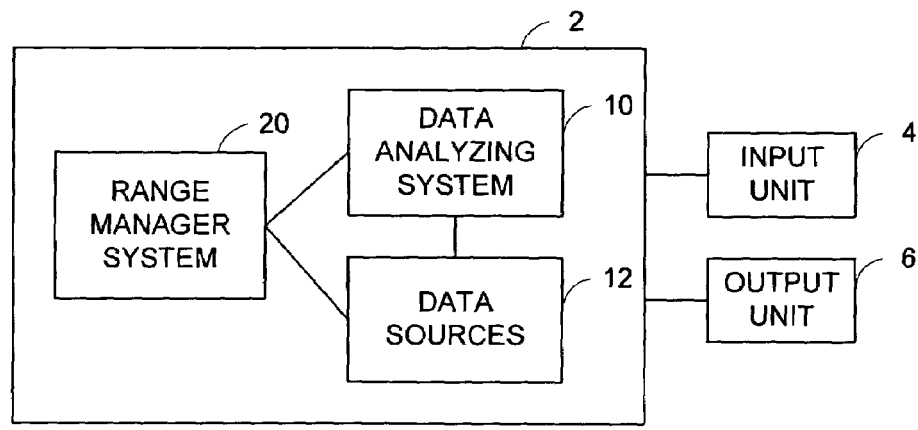
FIG. 1 is a block diagram showing a range manager system in accordance with an embodiment of the present invention.

FIG. 1 shows a computer system 2 in which a range manager system 20 is suitably used. The computer system 2 has an input unit 4 and an output unit 6. The range manager system 20 suitably works with or within a data analyzing system 10, such as a business intelligence system, that provides views or reports of data stored in one or more data sources 12. The range manager system 20 manages range definitions for the data analyzing system 10 to select data in certain ranges for generating reports or other purposes.

The range manager system 20 presents to users range definition indicators that visually represent range definitions. Each range definition indicator includes ranges that are vertically arranged. The range manager system 20 can automatically prevent the users from defining overlapped ranges. The range definition indicator also includes boundary values. A boundary value is located near the boundary between two neighboring ranges such that the location of the boundary value visually indicates to which range the boundary value belongs. Thus, the users can intuitively understand the precise definition of the ranges. The range manager system 20 allows the users to set more than one range in a single range definition indicator. The range manager system 20 may provide a range definition indicator for various types of data, such as numbers, alphanumeric values, dates, date-times, and intervals.

Figure 2:
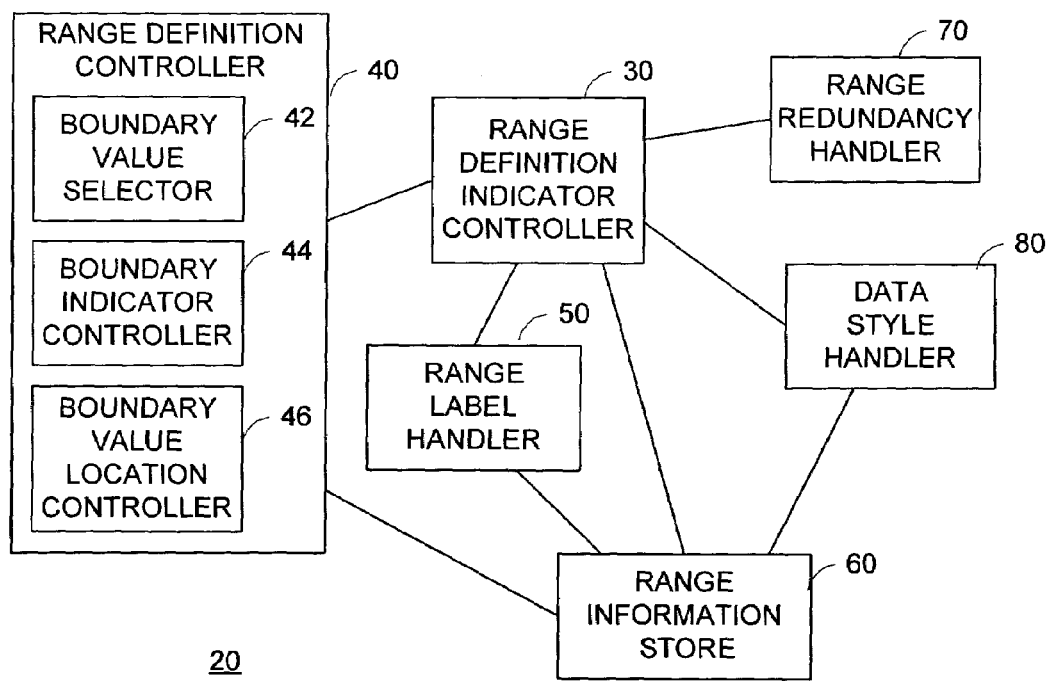
FIG. 2 is a block diagram showing an embodiment of the range manager system.

As shown in FIG. 2, the range manager system 20 comprises a range definition indicator controller 30, a range definition controller 40, a range label handler 50, and a range information store 60.

The range definition controller 40 controls the setting of the definition of ranges. The range definition controller 40 has a boundary value selector 42, a boundary indicator controller 44, and a boundary value location controller 46.

The boundary value selector 42 allows the user to set boundary values, or threshold values, to define ranges. The user may insert new values or modify existing values. A boundary value may be an actual value or a percentage value of various types of data, such as numbers, alphanumeric values, dates, date-times, and intervals.

The boundary value selector 42 may provide a set of values potential as boundary values, and allow the user to select one or more desired values. When the user chooses to select a value from a set, the boundary value selector 42 may present a menu showing a list of available data groups in the data sources 12 for user's selection. When the user wants to use a date and/or time or an interval as a boundary value, the boundary value selector 42 may provide a calendar and/or clock representation for the user to select a desired date and/or time or interval.

The boundary value selector 42 may present a searching dialog to search values available in the data sources 12.

The boundary indicator controller 44 controls the presentation of one or more range boundary indicators based on the boundary values. A boundary indicator may be a line or a symbol dividing ranges. The boundary indicator controller 44 provides the range boundary indicators such that neighboring ranges are arranged vertically in a range definition presentation.

The boundary value location controller 46 controls the location of each boundary value relative to any existing boundary values such that the order of the boundary values in a single range definition indicator is maintained. It is desirable that the boundary value location controller 44 arranges the boundary values from the highest to the lowest from the top to the bottom in the range definition presentation so that the user can intuitively comprehend the range definitions. When a new boundary value is added, the boundary value location controller 46 inserts the new value in order relative to existing boundary values. When an existing boundary value is modified, the boundary value location controller 46 rearranges boundary values as necessary so that the order of the boundary values are maintained.

The boundary value location controller 46 also controls the location of each boundary value relative to its associated boundary indicator. The boundary value location controller 46 locates a boundary value below its associated boundary indicator when the boundary value is included in the range just below the boundary indicator. This visually indicates that the range below the boundary indicator is to be less than or equal to the boundary value, and the range above the associated boundary indicator is defined to be more than the boundary value. Similarly, the boundary value location controller 46 locates a boundary value above its associated boundary indicator when the boundary value is included in the range just above the boundary indicator. This visually indicates that the range above the boundary indicator is defined to be more than or equal to the boundary value, and the range below the associated boundary indicator is defined to be less than the boundary value. Thus, the user can intuitively understand the exact definition of the ranges.

The range label handler 50 handles labeling of each range. A range label may be a text, an image, a symbol, or a combination of these. A range label may indicate a category or description of the values within the range, such as "Excellent", or "Poor". The range label handler 50 allows the user to enter a range label for each range. The range label handler 50 may provide a list of potential range labels, and allow the user to select one.

The range information store 60 stores predefined range defining forms, range definitions, conditional styles and/or other information. The range definition indicator controller 30, range definition controller 40 and range label handler 50 may use information stored in the range information store 60 to control presentations.

The range manager system 20 may also have a range redundancy handler 70, as shown in FIG. 2. The range redundancy handler 70 handles redundancy in ranges. It treats neighboring ranges having a same range label as one range, and have the range definition indicator controller 30 to present only a single range for these ranges. For example, if the user defines three ranges and labels them Excellent-Excellent-Average, the range redundancy handler 70 treats the first two ranges having the same range label Excellent as one range, and have the range definition indicator controller 30 to present to-the user only two ranges labeled Excellent and Average. If the user labels three ranges Excellent-Average-Excellent, all neighboring ranges have different range labels. Accordingly, in this case, the range redundancy handler 70 does not change the ranges, and the range definition indicator controller 30 presents all three ranges.

The range manager system 20 may be provided for a data analyzing system 10 that is capable of presenting data in a report, using different styles of data presentation, depending on the range to which each data belongs. For example, data falls within a range labeled Excellent may be highlighted in green, and data falls within a range labeled Poor may be highlighted in red. In that case, the user may use the range manager system 20 for setting the conditional styling of data presentation. To this end, the range manager system 20 may have a data style handler 80.

The data style handler 80 allows the user to manipulate conditional styling during the definition of ranges in the range definition indicator. It provides previews of data presentation styles based on the range label, and allows the user to modify the styles. The data style handler 80 allows conditional styling on various data types, such as numbers, alphanumeric values, dates, date-times, and intervals. The data style handler 80 may provide predefined styles to assist the user to easily select a style for a certain range. The data style handler 80 may allow the user to set a custom style for a range. In that case, the range information store 60 stores predefined styles and customization of styles.

In this case, the range label handler 50 is used to select a style for each range based on the styles stored in the range information store 60. Using the range label handler 50, the user may select a name of the desired style, e.g., Excellent, for each range.

The range definition indicator controller 30 controls the presentation of range definition indicators on the output unit 6, in cooperation with the range definition controller 40, the range label handler 50, the range information store 60, the range redundancy handler 70, and/or the data style handler 80. The range definition indicator controller 30 may use a range defining dialog to allow the user to view and set or modify the range definition indicators.

The range definition indicator controller 30 may control the presentation of range definition indicators directly or through a user interface of the data analyzing system 10. It may be a part of the user interface of the data analyzing system 10.

Figure 3:
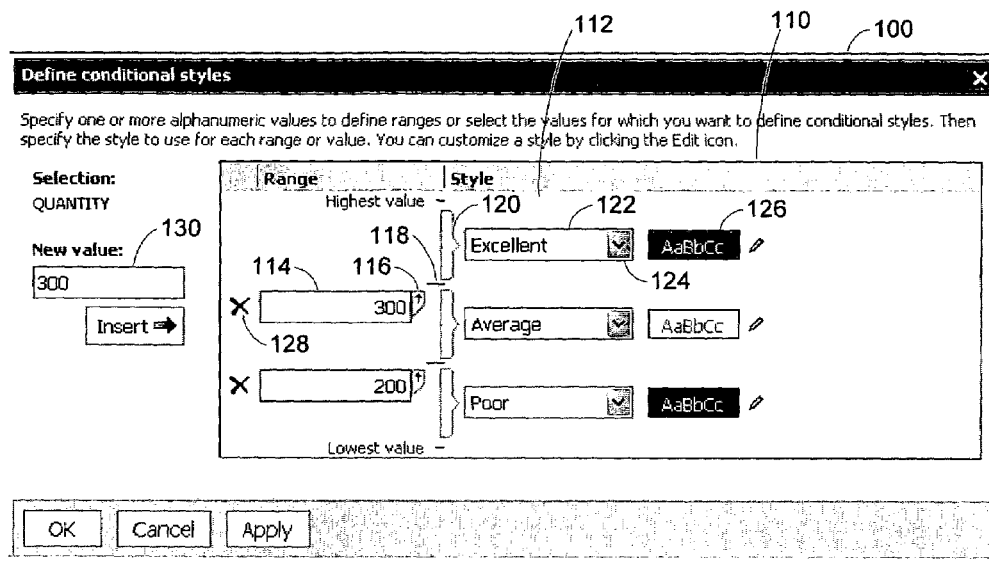
FIG. 3 is a diagram showing an example of a range definition indicator.

FIG. 3 shows an example of a range defining dialog 100 for allowing the user to define ranges. The range defining dialog 100 has a range properties pane 110 and a new value insertion section 130.

The range properties pane 110 presents a range definition indicator 112. The range definition indicator 112 includes boundary value boxes 114, range boundary indicators 118, ranges 120, and range label boxes 122. The range boundary indicators 118 indicate boundaries of ranges 120.

Each boundary value box 114 shows a boundary value. The boundary value boxes 114 are arranged vertically in the order of the values. A boundary value box 114 with the highest value is shown adjacent the top of the range properties pane 110. A boundary value box 114 with the lowest value is shown adjacent to the bottom of the range properties pane 110. The properties pane can scroll when more range values are included than can be shown.

The range manager system 20 allows the user to modify the value in a boundary value box 114. When the modified value changes the order of the values, the range manager system 20 automatically rearranges the values so that the order of the values is maintained and a higher value appears in a higher boundary value box 114.

Each boundary value box 114 may have a boundary value moving control 116. The boundary value moving control 116 allows the users to relocate the boundary value box 114 relative to the associated boundary indicator 118. Thus, the user can adjust whether its associated boundary value defines the utmost top end of the range 120 or the lowest end of the next range 120. A move control 116 may have an arrow to represent the direction to which the associated boundary value box 114 is repositioned. It may provide a tool-tip on the move control 116 to indicate the direction of the move that will be caused by the move control 116, such as "Move value above threshold" or "Move value below threshold".

Figure 3A:
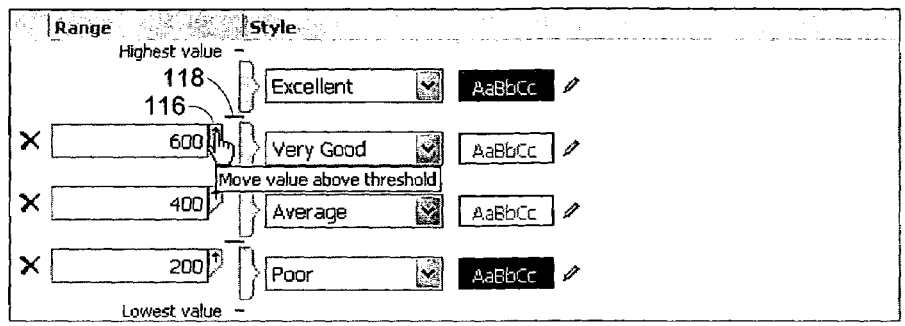
FIG. 3A is a diagram showing the operation of a boundary value move control.
Figure 3B:
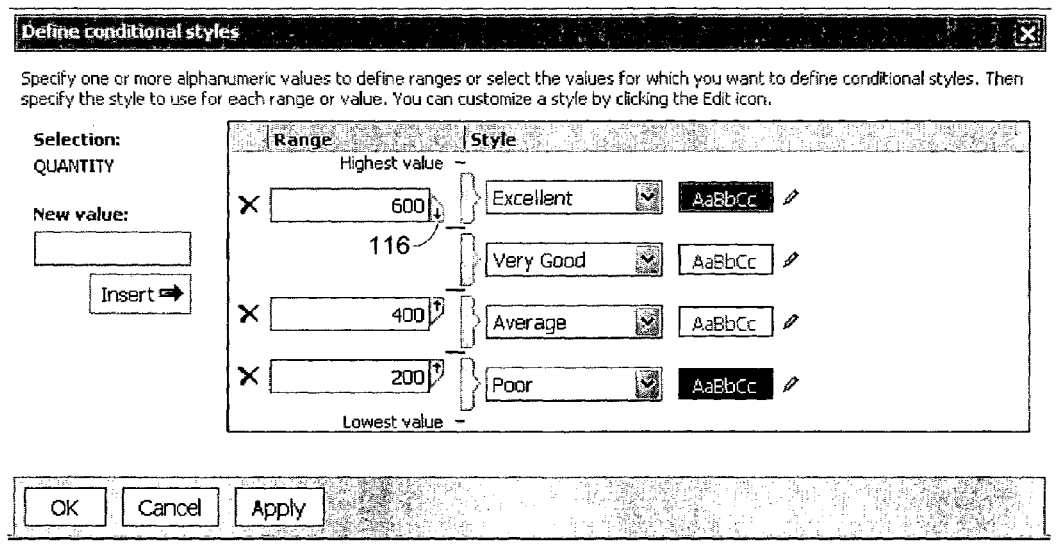
FIG. 3B is a diagram showing the operation of a boundary value move control.

FIG. 3A shows an example where the user brings a cursor over a move control 116 that is associated with the range value box labeled "600". The range value box "600" is currently located below the associated boundary or threshold 118. This represents that the value "600" belongs to the second top range labeled "Very Good", and the top range labeled "Excellent" is defined as "more than 600". A tooltip indicates that the selection of the move control 116 will move the boundary value box "600" above the threshold 118. When the user selects the control 116, the range value box "600" is relocated above the threshold 118, as shown in FIG. 3B. The top range "Excellent" is now defined as "more than or equal to 600". The move control 116 now shows a down arrow to indicate that the selection of the control 116 will move the boundary value box below the threshold.

As shown in FIG. 3, the range label boxes 122 show range labels for the ranges 120. Range labels may be style names. The user may modify the range labels in the range label boxes 122. The range label box 122 may have an expanding control 124 to present a list of potential range labels for user's selection.

The range label box 122 may also have a preview box 126 to provide a preview of the style of data presentation, based on the selected style name in the range label box 122. The user may modify the style.

A boundary may be removed by selecting a deletion button 128 associated with the relevant boundary value box 114.

Figure 13A:
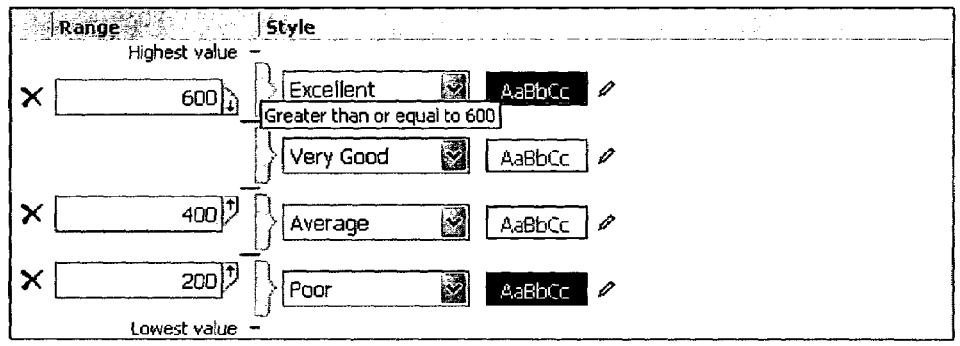
FIG. 13A is a diagram showing an example of the text definition of a range.
Figure 13B:
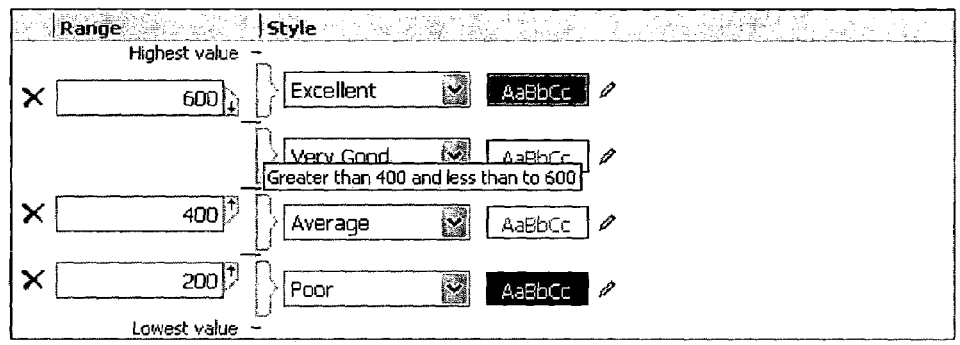
FIG. 13B is a diagram showing another example of the text definition of a range.
Figure 13C:
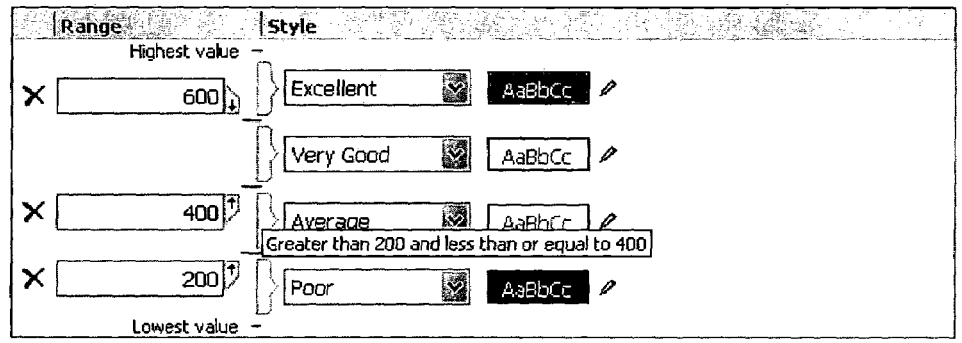
FIG. 13C is a diagram showing another example of the text definition of a range.

The ranges 120 or the range definition indicator 112 may also provide a text definition of a range, such as "less than or equal to 200". FIGS. 13A-C show examples of text definitions displayed as a tooltip.

The range defining dialog 100 may be invoked from a tool list of the data analyzing system 10, or a menu on a measure for which a report is being generated.

FIGS. 4-12 show examples of the user interface presentation in order to exemplify the operation of the range manager system 20.

Figure 4:
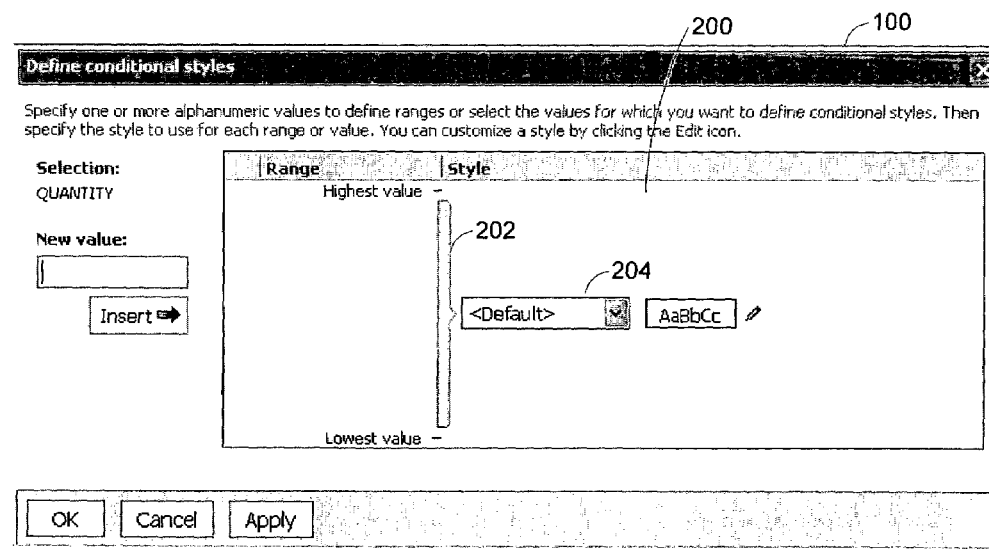
FIG. 4 is a diagram showing another example of a range definition indicator.
Figure 5:
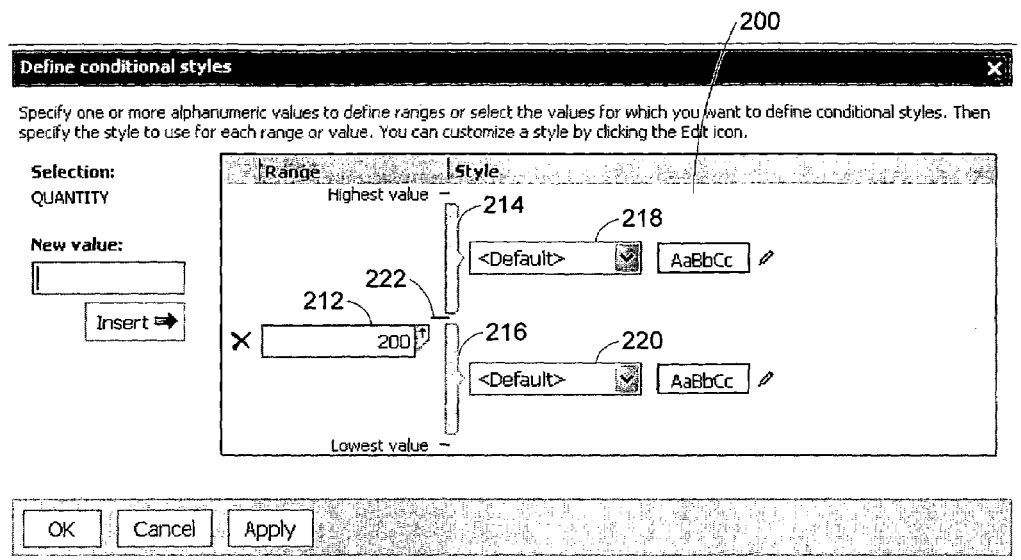
FIG. 5 is a diagram showing another example of a range definition indicator.

FIG. 4 shows a range defining dialog 100 presented by the range manager system 20 when the user invokes the system 20. The range defining dialog 100 shows a range definition indicator 200 having a single range 202 and a range label box 204. As shown in FIG. 5, when the user enters a new boundary value "200" and inserts it to the range definition indicator 200, the range definition indicator 200 shows a new boundary value box 212 labeled with "200", and two ranges 214, 216 divided by a boundary indicator 222. The ranges 214, 216 have range label boxes 218, 220.

Figure 6:
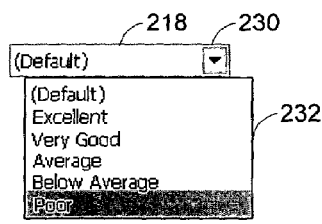
FIG. 6 is a diagram showing another example of a range definition indicator.
Figure 7:
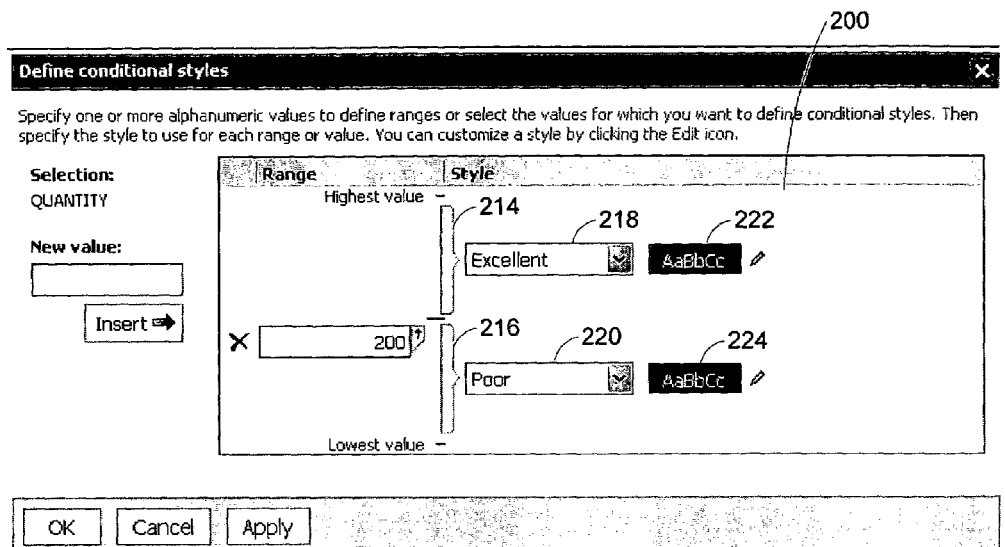
FIG. 7 is a diagram showing another example of a range definition indicator.

In order to label the range 214, as shown in FIG. 6, the user may provide a text inline in a text box 218, or select an expansion control 230 of the range label box 218 if available. Selecting the expansion control 230 opens a list of available range labels in a dropdown menu box 232. The range labeling may be used to select styles of presentation of values in a report, as described above. The dropdown menu box 232 may provide a list of names of available styles. FIG. 7 shows that the range label box 218 is labeled with "Excellent", and the range label box 220 is labeled with "Poor". Previews of the styles "Excellent" and "Poor" are shown in the preview boxes 222, 224, respectively. In the dropdown menu 232 in FIG. 6, the range manager system 20 may provide an option that allows the user to define a custom style label or symbol. This option brings the user to a dialog in which the user can either select a custom style, a predefined label with a text, an image, or a symbol, or create a new symbol using a drawing tool.

Figure 8:
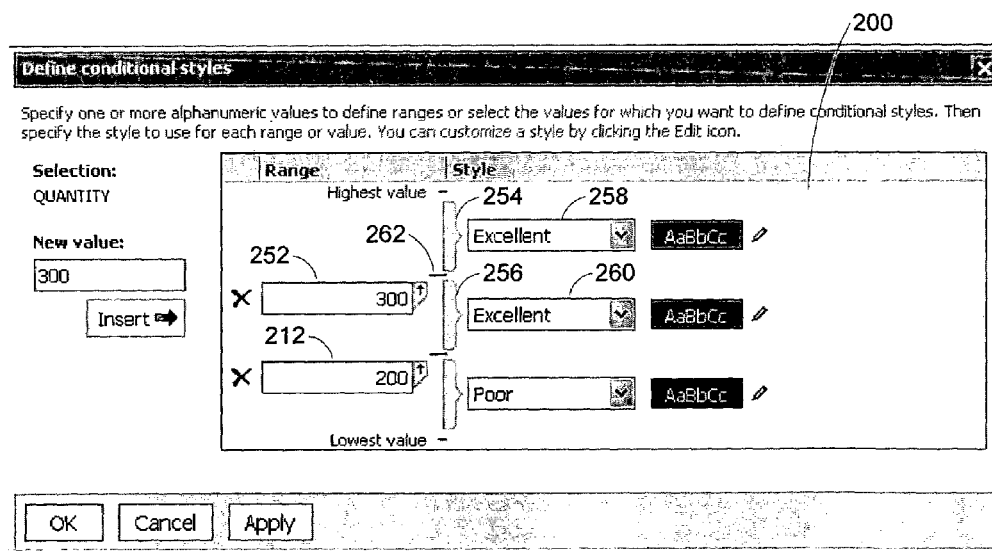
FIG. 8 is a diagram showing another example of a range definition indicator.
Figure 9:
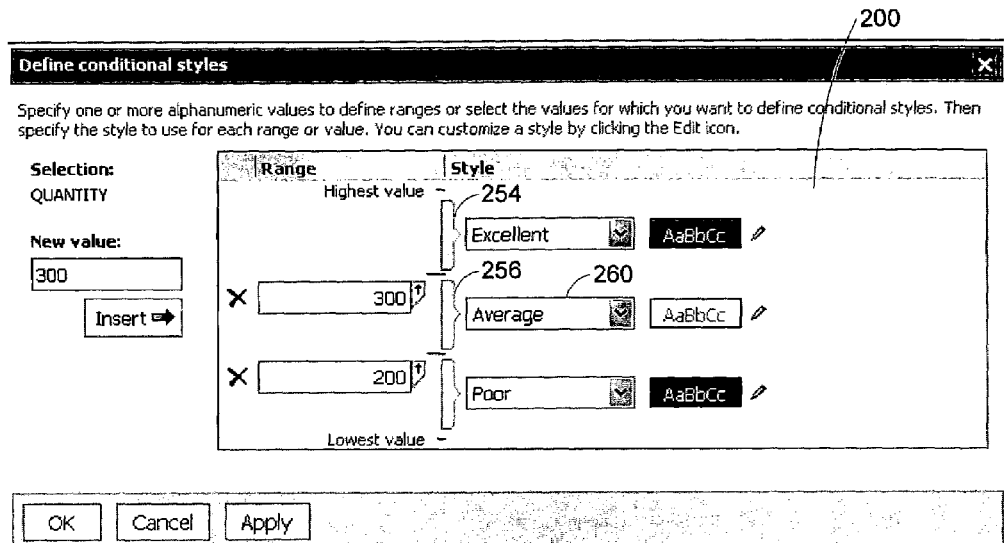
FIG. 9 is a diagram showing another example of a range definition indicator.

As shown in FIG. 8, when the user inserts another boundary value "300", an additional boundary value box 252 with label "300" is inserted in the range definition indicator 200 above the existing boundary value box 212 labeled with "200". The insertion of the boundary value "300" caused the range 214 shown in FIG. 7 to split into two ranges 254, 256 divided by the boundary indicator 262. Each range 254, 256 has a corresponding range label box 258, 260 with the same labeling "Excellent" as the original range 214. FIG. 9 shows that the user changed the label of the range 256 to "Average" as shown in the range label box 260.

Figure 10:
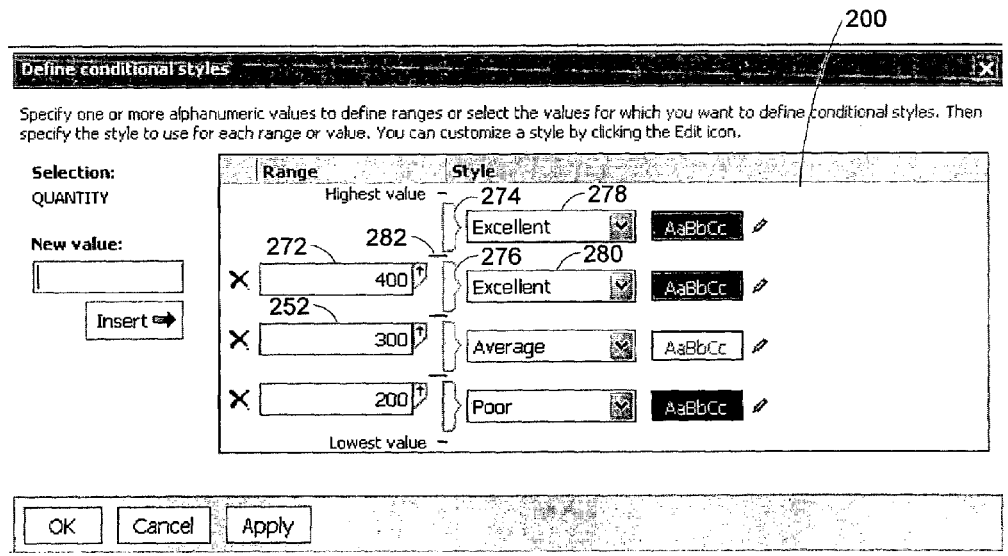
FIG. 10 is a diagram showing another example of a range definition indicator.
Figure 11:
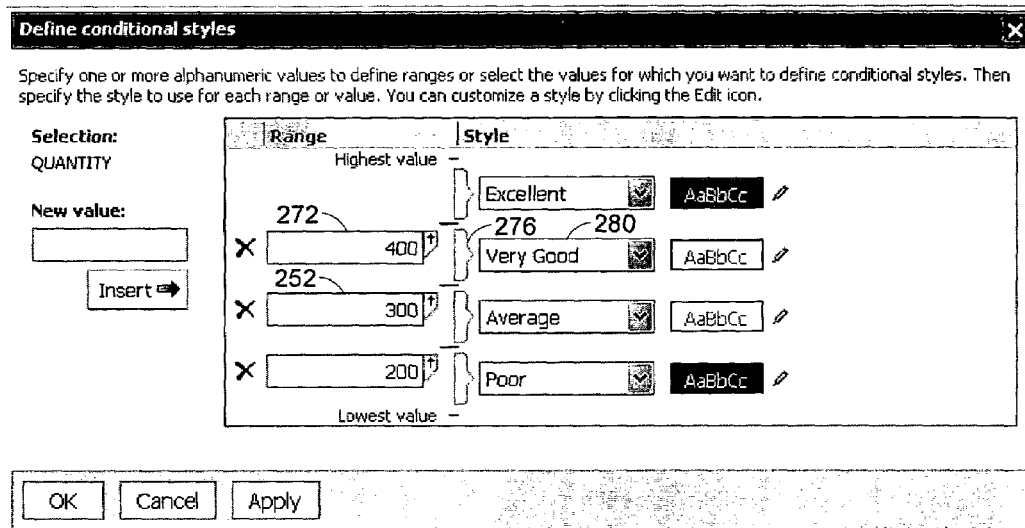
FIG. 11 is a diagram showing another example of a range definition indicator.

FIG. 10 shows insertion of the third boundary value "400". A new boundary value box 272 with label "400" is inserted in the range definition indicator 200 above the existing boundary value box 252 labeled with "300". The insertion of the boundary value "400" caused the range 254 shown in FIG. 9 to split into two ranges 274, 276 divided by the boundary indicator 282. Each range 274, 276 has a corresponding range label box 278, 280 with the same labeling "Excellent" as the original range 254. FIG. 11 shows that the user changed the label of the range 276 to "Very Good" as shown in the range label box 280.

Figure 12:
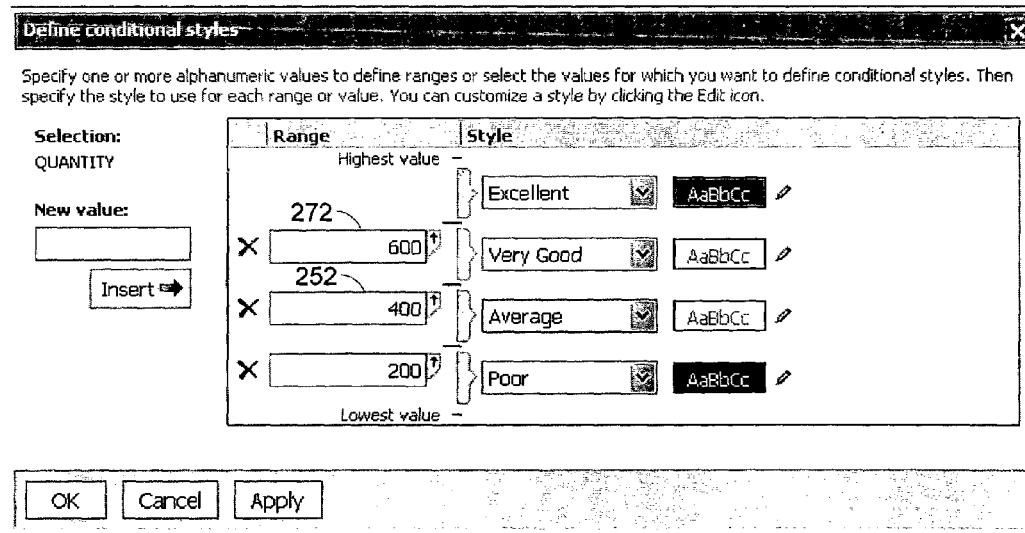
FIG. 12 is a diagram showing another example of a range definition indicator

FIG. 12 shows modifying the existing boundary value "300" in the boundary value box 252 to "600". The range manager system 20 rearranged the boundary values, so that the new value "600" is shown in the boundary box 272, and the value "400" previously shown in the boundary box 272 is now shown in the boundary box 252. The label boxes remain the same.

When the user inserts a fifth value, the range definition indicator 200 uses scrolling to present all ranges defined.

As described above, the range manager system 20 provides and maintains the correct relative location of the boundary values in the range definition indicator, even when new values are added or existing values are modified. The range manager system 20 prevents overlaps of ranges automatically, and visually identifies which boundary value is included or excluded in each range. The vertical arrangement of the ranges makes the range definition indicator scalable.

The range manager system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements, which may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the range manager system are described separately, however, two or more elements may be provided as a single element, or one or more elements may be shared with other component in computer systems.

What is claimed is:

1. A range manager system comprising:
    a range definition controller receiving a plurality of boundary values from a user and positioning each received boundary value in numerical order on a single range between a highest value and a lowest value, thereby creating sub-ranges within the single range without requiring the user to specify the boundaries of the sub-ranges, wherein the sub-ranges are non-overlapping and collectively span the single range entirely;
    a range label handler applying user-defined labels to the sub-ranges; and
    a range definition display area controller controlling, by operation of one or more computer processors, presentation of a range definition display area to the user via an output unit, the range definition display area representing a definition of the sub-ranges, the range definition display area controller presenting the sub-ranges in vertical arrangement so as to visually convey the definition of the sub-ranges,
    wherein the range definition display area controller comprises:
        a boundary indicator controller controlling presentation of one or more range boundary indicators based on the boundary values; and a boundary value location controller controlling a location of each boundary value relative to its associated boundary indicator so as to indicate to which sub-range the boundary value belongs a range redundancy handler handling redundancy in the sub-ranges based on the boundary values and the labels of the sub-ranges such that neighboring sub-ranges having a same label are presented as a single sub-range having a single label.

2. The range manager system as claimed in claim 1, wherein the boundary value selector provides a set of values potential as boundary values, and allows the user to select one or more desired values.

3. The range manager system as claimed in claim 2, wherein the boundary value selector provides a calendar and/or clock representation for a user to select a date and/or time as a boundary value.

4. The range manager system as claimed in claim 1, wherein the boundary value selector provides a searching dialog, and allows the user to search a value available in a data source.

5. The range manager system as claimed in claim 1, wherein the boundary value location controller controls arrangement of the boundary values such that the boundary values are arranged in order and the order is maintained.

6. The range manager system as claimed in claim 1 further comprising:
a range information store storing information of one or more predefined range conditions, wherein the range definition display area controller presents one of the predefined range conditions.

7. The range manager system as claimed in claim 1 further comprising:
a data style handler managing presentation and modification of a style of data presentation based on the range labels.

8. A range defining user interface comprising:
a range definition display area being output by a range definition display area controller and by operation of one or more computer processors, the range definition display area comprising:
one or more boundary value boxes presenting boundary values on a single range between a highest value and a lowest value, the boundary value boxes being arranged vertically in order of the boundary values;
one or more sub-ranges within the single range, the sub-ranges defined by the boundary values, the sub-ranges being arranged vertically within the single range, wherein the sub-ranges are non-overlapping and collectively span the single range entirely;
one or more range boundary indicators indicating boundaries of the sub-ranges based on the boundary values; and
one or more user-defined range labels;
wherein a relative location of a boundary value box and its associated range boundary indicator is variable so as to visually represent to which range a boundary value shown in the boundary value box belongs, and wherein the range definition display area controller handles redundancy in the sub-ranges based on the boundary values and the labels of the sub-ranges such that neighboring sub-ranges having a same label are presented as a single sub-range having a single label.

9. The range defining user interface as claimed in claim 8, wherein the boundary value boxes allows the user to modify a boundary value in one of the boundary value boxes, and maintains the order of the boundary values in the boundary value boxes.

10. The range defining user interface as claimed in claim 9, wherein the range label boxes have preview boxes presenting previews of presentation styles of data fall within the sub-ranges depending on the range labels.

11. The range defining user interface as claimed in claim 8, wherein the range definition display area further comprises:
one or more boundary value moving controls, each associated with a boundary value box, each boundary value moving control allowing the user to relocate the boundary value box relative to its associated boundary indicator so as to change the sub-ranges to which a boundary value shown in the boundary value box belongs.

12. The range defining user interface as claimed in claim 8, wherein the range definition display area further comprises:
one or more range label boxes, each range label box presenting a user-defined range label for its associated sub-range.

13. The range defining user interface as claimed in claim 8 further comprising:
a new boundary value input section allowing the user to insert a new boundary value into the range definition display area.

14. A computer readable storage medium storing computer readable code for use in the execution in a computer of a method of managing a user interface to define a range, the method comprising the steps of:
receiving a plurality of boundary values from a user;
positioning each received boundary value in numerical order on a single range between a highest value and a lowest value, thereby creating sub-ranges within the single range without requiring the user to specify the boundaries of the sub-ranges, wherein the sub-ranges are non-overlapping and collectively span the single range entirely;
applying user-defined labels to the sub-ranges; and
controlling presentation of a range definition display area representing a definition of the sub-ranges, the range definition display area controller presenting the sub-ranges in vertical arrangement so as to visually convey the definition of the sub-ranges, wherein the step of controlling presentation of a range definition comprises the steps of:
controlling presentation of one or more range boundary indicators based on the boundary values; and
controlling a location of each boundary value relative to its associated boundary indicator so as to indicate to which sub-range the boundary value belongs;
wherein the range definition display area controller handles redundancy in the sub-ranges based on the boundary values and the labels of the sub-ranges such that neighboring sub-ranges having a same label are presented as a single sub-range having a single label.

15. The computer readable storage medium as claimed in claim 14, wherein the step of controlling presentation of a range definition presents a range definition display area, the range definition display area comprising:
one or more boundary value boxes presenting boundary values, the boundary value boxes being arranged vertically in order of the boundary values;
one or more sub-ranges defined by the boundary values, the sub-ranges being arranged vertically; and
one or more range boundary indicators indicating boundaries of the sub-ranges based on the boundary values,
wherein the step of controlling a location comprising the step of allowing the user to change a relative location of a boundary value box and its associated range boundary indicator so as to visually represent to which sub-range a boundary value shown in the boundary value box belongs.

16. A method of managing a user interface to define a range, the method comprising the steps of:
presenting to a user a range definition display area comprising:
one or more boundary value boxes presenting boundary values on a single range between a highest value and a lowest value, the boundary value boxes being arranged vertically in order of the boundary values;
one or more sub-ranges within the single range, the sub-ranges defined by the boundary values, the sub-ranges being arranged vertically within the single range, wherein the sub-ranges are non-overlapping and collectively span the single range entirely;
one or more range boundary indicators indicating boundaries of the sub-ranges based on the boundary values; and
one or more user-defined range labels, wherein neighboring sub-ranges having a same label are presented as a single sub-range having a single label; and
allowing the user to change a relative location of a boundary value box and its associated range boundary indicator so that the relative location visually represents to which sub-range a boundary value shown in the boundary value box belongs.

17. The method as claimed in claim 16, wherein the allowing step comprises the steps of:
allowing the user to modify a boundary value in one of the boundary value boxes, and
maintaining the order of the boundary values in the boundary value boxes.

18. The method as claimed in claim 16, wherein
the presenting step further presents in the range definition display area one or more boundary value moving controls, each associated with a boundary value box; and
the allowing step allows the user to relocate the boundary value box relative to its associated boundary indicator so as to change the sub-ranges to which a boundary value shown in the boundary value box belongs.

19. The method as claimed in claim 16, wherein the presenting step further presents one or more range label boxes in the range definition display area, each range label box presenting a user-defined range label for its associated sub-range.

20. The method as claimed in claim 19, wherein
the presenting step further provides a preview box to each range label box in the range definition display area presenting previews of presentation styles of data fall within the sub-ranges depending on the range labels; and
the method further comprises the step of allowing the user to select the preview box to see an associated preview of the presentation styles of data.

21. The method as claimed in claim 16, wherein
the presenting step further presents a new boundary value input section in the range definition display area; and
the method further comprises the step of allowing the user to insert a new boundary value into the range definition display area.

* * * * *